(12) United States Patent
Kannegaard Andersen et al.

(10) Patent No.: US 9,467,019 B2
(45) Date of Patent: Oct. 11, 2016

(54) ELECTRIC MOTOR (71) Applicant: GRUNDFOS HOLDING A/S, Bjerringbro (DK)

(72) Inventors: Lars Kannegaard Andersen, Randers NV (DK); Jørgen Elkjær Jensen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 14/367,457

(22) PCT Filed: Dec. 20, 2012

(86) PCT No.: PCT/EP2012/076493
§ 371 (c)(1),
(2) Date: Jun. 20, 2014

(87) PCT Pub. No.: WO2013/092917
PCT Pub. Date: Jun. 27, 2013

(65) Prior Publication Data
US 2014/0354088 A1    Dec. 4, 2014

(30) Foreign Application Priority Data
Dec. 23, 2011    (EP) .................................. 11195636

(51) Int. Cl.
| | |
|---|---|
| *H02K 5/22* | (2006.01) |
| *H02K 5/04* | (2006.01) |
| *F04D 13/06* | (2006.01) |
| *H02K 5/128* | (2006.01) |
| *H02K 9/22* | (2006.01) |
| *H02K 5/167* | (2006.01) |
| *F04D 29/58* | (2006.01) |

(Continued)

(52) U.S. Cl.
CPC ........ *H02K 5/22* (2013.01); *F04D 1/00* (2013.01); *F04D 13/0606* (2013.01); *F04D 13/0633* (2013.01); *F04D 13/0686* (2013.01); *F04D 13/0693* (2013.01); *F04D 29/046* (2013.01); *F04D 29/086* (2013.01); *F04D 29/5813* (2013.01); *H02K 5/04* (2013.01); *H02K 5/128* (2013.01); *H02K 5/1672* (2013.01); *H02K 5/225* (2013.01); *H02K 9/22* (2013.01); *H02K 7/083* (2013.01); *H02K 2205/09* (2013.01)

(58) Field of Classification Search
CPC ................................. H02K 5/04; H02K 5/22
IPC ............................................... H02K 5/04, 5/22
See application file for complete search history.

(56) References Cited

U.S. PATENT DOCUMENTS 5,006,744 A * 4/1991 Archer et al. .................. 310/89
5,714,816 A * 2/1998 Jensen et al. .................. 310/89
(Continued)

FOREIGN PATENT DOCUMENTS

DE    29 08 936 A1    9/1979
DE    195 11 114 C1   8/1996
(Continued)

Primary Examiner — Dang Le
(74) Attorney, Agent, or Firm — McGlew and Tuttle, P.C.

(57) ABSTRACT

A connection housing (11) which arranged outside on the motor housing (9), receives electrical connections as well as electronic components and, with respect to the motor axis, extends peripherally and axially of the motor housing (9). The connection housing (11) has two individual housings (12, 13) which are connected to one another and whose interiors are connected.

20 Claims, 7 Drawing Sheets (51) Int. Cl.
*F04D 1/00* (2006.01)
*F04D 29/046* (2006.01)
*F04D 29/08* (2006.01)
*H02K 7/08* (2006.01)

(56) References Cited

U.S. PATENT DOCUMENTS

| | | | |
|---|---|---|---|
| 5,814,909 A * | 9/1998 | Yamada et al. | 310/64 |
| 6,107,708 A * | 8/2000 | Yamaguchi | B60H 1/00457 310/58 |
| 6,107,713 A * | 8/2000 | Hulsmann et al. | 310/75 R |
| 6,177,740 B1 * | 1/2001 | Burns | 310/68 R |
| 6,707,185 B2 * | 3/2004 | Akutsu et al. | 310/71 |
| 7,781,926 B2 * | 8/2010 | Schmidt et al. | 310/77 |
| 2003/0127921 A1 | 7/2003 | Akutsu et al. | |
| 2003/0230942 A1 | 12/2003 | Okubo et al. | |
| 2009/0289513 A1 | 11/2009 | Vadillo et al. | |
| 2010/0090635 A1 * | 4/2010 | Andersen et al. | 318/490 |

FOREIGN PATENT DOCUMENTS

| | | |
|---|---|---|
| DE | 298 07 831 U1 | 8/1998 |
| DE | 10 2005 032968 A1 | 2/2007 |
| EP | 1 063 751 A1 | 12/2000 |
| EP | 1 582 751 A1 | 10/2005 |
| EP | 1 742 334 A1 | 1/2007 |
| EP | 2 048 767 A2 | 4/2009 |
| FR | 28 96 634 A1 | 7/2007 |
| WO | 00/51863 A1 | 9/2000 |
| WO | 2007/108049 A1 | 9/2007 |
| WO | 2008/135103 A1 | 11/2008 |

* cited by examiner

ELECTRIC MOTOR

CROSS REFERENCE TO RELATED APPLICATIONS

This application is a United States National Phase Application of International Application PCT/EP2012/076493 filed Dec. 20, 2012 and claims the benefit of priority under 35 U.S.C. §119 of European Patent Application EP 11195636.3 filed Dec. 23, 2011, the entire contents of which are incorporated herein by reference.

FIELD OF THE INVENTION

The invention relates to an electric motor, in particular a canned motor, with a connection housing which is arranged outside on the motor housing, receives electrical connections as well as electronic components and with respect to the motor axis extends peripherally and axially of the motor housing.

BACKGROUND OF THE INVENTION

Electric motors of the mentioned type are applied for the most varied of purposes and are on the market in comprehensive constructional designs. In particular, such electric motors are also applied as drive motors for centrifugal pumps and are then often designed as a canned motor, wherein the rotor runs in a can filled with fluid, and the can is filled for example with the delivery fluid of the pump, and a part flow of the delivery flow flows through this can.

With electric motors, it is common for these to comprise a so-called terminal box, i.e. a connection housing which is arranged outside on the motor housing and which receives electrical connections as well as electronic components. With electric motors, it is counted as belonging to the state of the art, to arrange such a connection housing peripherally with respect to the motor axis or also axially, i.e. at an end-side of the motor. Connection housings are also known, which extend peripherally as well as on the end-side, e.g. with the heating circulation pumps marketed by Grundfos under the name Magna type 32-60. Thereby, the connection housing typically serves for connecting the motor windings to the electric supply mains, thus for connecting the motor to the supply mains as well as for receiving electronic components. In the simplest case, these can be suppression capacitors or likewise. With modern motors, this connection housing mostly yet comprises motor electronics. This on the one hand can be power electronics, and on the other hand microprocessors, and the electronic components which are common in the context of digital signal processing. In particular, with modern motors controlled by frequency converter, as are regularly applied nowadays with centrifugal pumps but also with other drive applications, it is counted as belonging to the state of the art, to arrange the frequency converter electronics completely or partly in the connection housing.

It is particularly the case when the power electronics are arranged in the connection housing, that it is necessary to effectively and securely lead away the waste heat arising in the housing. In order to ensure this, the connection housings of the known construction type are mostly designed of metal and are provided with cooling ribs, or however the power electronics are cooled via a cooling body arranged outside on the housing or by way of other suitable cooling measures. These cooling bodies require a lot of space and increase the dimensions of the electric motor. It is often problematic that heat-sensitive components also need to be arranged in the connection housing. The design of the housing or housing part of metal is complicated and extensive. Different housings are always necessary for different power sizes and connection housing variants, which requires quite some effort with regard to manufacture, tooling and storage.

SUMMARY OF THE INVENTION

Against this background, it is an object of the invention to design an electric motor of the known type, such that the previously mentioned disadvantages are at least reduced, i.e. to improve the connection housing with regard to arrangement, design and accommodation of the connections and electronic components, which are arranged therein.

The electric motor according to the invention, which in particular is designed and envisaged as a canned motor for the drive of a centrifugal pump, comprises a connection housing which is arranged outside on the motor housing, receives electrical connections as well as electronic components and extends peripherally and axially of the motor housing with respect to the motor axis. According to the invention, the connection housing comprises two individual housings which are connected to one another and whose interiors are connected.

The basic concept of the present invention is to provide two individual housings which are connected to one another and to connect their interiors to one another, instead of providing a common connection housing for connections and electronic components, as was hitherto the case.

Surprisingly, it has been found that the arrangement of two individual housings connected to one another entails numerous advantages compared to the known single individual housing.

Thus, the individual housings can be of different materials and thus can be better adapted to the respective application purpose. An improved thermal separation can be effected by way of the arrangement of two individual housings. Due to the fact that the individual housings are connected to one another, these can be handled as one housing, and thus it is not the case that two housings are to be fastened separately, but as the case may be, the fastening can be effected only via an individual housing or at both individual housings. Not only can the electrical connection between the housings be provided in a practically infinite manner and in a manner which is simple with regard to design, but as will yet be explained in detail further below, one can effect a particularly advantageous utilization of space of the individual housings, without for example electronic components or likewise necessarily having to be adapted to the size of one of the two individual housings, all this due to the interiors of the individual housing being connected, in accordance with the invention.

Thereby, according to the invention, advantageously an individual housing is designed as an axial housing and the other individual housing is designed as a radial housing. Axial housing within the context of the invention means that this connects to the motor housing in the axial direction, thus in the direction of the rotation axis of the motor. Radial housing in the context of the invention means that this connects radially to the motor housing, thus essentially radially to the rotation axis of the motor. By way of the radial and axial arrangement of the individual housings, on the one hand the space present on the peripheral side of the motor housing and on the other hand the space present at the end-side of the motor housing usually at one side, can be utilized, in order in this way to realize an electric motor which is built in a compact manner.

Thereby, it is particularly advantageous if only one of the individual housings comprise lead feed-throughs into the outer surroundings. Typically, this is at least the lead feed-through for the electrical supply lead. However, one can also provide further lead feed-throughs, for example control leads, leads to sensors or likewise. If all these lead feed-throughs are provided in only one individual housing, the other individual housing, as the case may be, can be designed as a closed housing, thus does not compellingly need a re-openable cover. This arrangement also has the advantage that only one individual housing requires these comparatively extensive lead seals, whilst the other individual housing can be designed as a quasi closed housing. Thus, only one individual housing needs to be provided for the accessibility from the outside, for example in order to connect the supply lead within the housing.

Thereby, it is particularly advantageous if the one or more lead feed-throughs are arranged in a radial peripheral wall of the axial housing. Such an arrangement is particularly useful with the use of the electric motor for the drive of a centrifugal pump, since then the electric connection leads are led out at a location which is far away from the fluid-leading pump and moreover the free end-side of the axial housing can be used for display and operating elements. Since it is particularly the case with circulation pumps that the arrangement is always such that the motor axis is arranged in a lying manner, i.e. is arranged horizontally, the lead feed-through in a radial peripheral wall of the axial housing is also advantageous with regard to the installation situation, since the leads are led out of the axial housing laterally at the end of the motor, thus where usually no high thermal and/or mechanical loading is present.

The individual housings according to a further development of the invention are advantageously constructed in a multi-part manner, wherein the materials of at least two components of the individual housings differ in thermal conductivity by at least a power of ten. Due to this arrangement, one the one hand a targeted discharge of heat from the power electronics which are arranged in an individual housing, can be achieved, and on the other hand, in regions which are not burdened too much with heat, one can apply materials which are not particularly selected for design with regard to thermal conductivity, but rather with regard to manufacturing costs, weight and manufacture. Thereby, typically one of the components is designed of highly thermally conductive metal, e.g. a light metal alloy, whereas the other individual housing component or components can be inexpensively designed of plastic as plastic injection molded parts. Such a design also serves for the modular construction, to the extent that a metallic individual housing which is comparatively expensive to manufacture, is applied for a multitude of different connection housings, wherein the other components consisting of plastic can be varied. A multitude of different connection boxes, for example for electric motors of a different power or for controls of different electronic equipment, can be manufactured inexpensively by way of this, with only one individual housing part.

Advantageously, the individual housings are each constructed of a base body and a cover, wherein the cover is arranged on the side of the base body which lies opposite and away from the motor housing, thus lies at the outside and is easily accessible.

According to an advantageous further development of the invention, a display and/or operating unit is provided, which is arranged in the cover of an individual housing, and specifically preferably in the cover of the axial housing. This free end-side of the electric motor is particularly favourable for attaching a display and/or operating unit, since the accessibility and visibility is typically at its best in this region. It is particularly with the use of the electric motor as a centrifugal pump drive, that this side is furthest way from the piping of the pump and thus mostly easily accessible.

Preferably, the connection housing of the electric motor according to the invention is envisaged and designed for receiving an electronic speed controller for the motor. Then it is particularly advantageous for the individual housing to receive the power part of the speed controller and for the other individual housing to receive the motor control, since then the motor control can be arranged in a space which is less exposed to the development of heat, compared to the power electronics. A targeted cooling of the one individual housing which receives the power part of the speed controller can then be provided, whereas the other individual housing can typically be designed without any special design measures for cooling.

One embodiment variant which is particularly advantageous with regard to design, results if the radial housing extends over the axial housing, and the individual housings are connected to one another in this region. Thereby, it is useful to connect to individual housings in this region not only to one another, but in the regions, in which the individual housings connect to one another, to provide recesses which are flush with one another, in the walls of both housings, as well as sealing means which surround these, and fastening means which fix the individual housings on one another. The recesses in the housings are advantageously provided in the walls, in which the radial housing projects beyond the axial housing, thus in a radial wall of the radial housing as well as in a radial wall of the axial housing. By way of this arrangement, it is possible to fix parts having a large height on a circuit board arranged in the radial housing, on the circuit board side in the radial housing and to permit them to project to into the axial housing, without a separate circuit board having to be provided for these components in the axial housing.

Advantageously, a positive-fit connection is selected for connecting the individual housings, for example one or more click connections and/or lock connections, which are provided in one of the components and which lock in the other component, for example spring tongues or likewise.

Preferably, the radial housing is fastened on the motor housing and specifically is preferably fastened by screw. In order to give the axial housing an adequate fastening stability, according to a further development of the invention, one envisages providing guide means between the motor housing and the axial housing, which hold the axial housing on the motor housing with a positive fit. The stability of the fastening of the individual housings is significantly increased by way of this, without having to provide fastening means which are to be handled separately. With a suitable design and alignment of the guide means, the positive-fit fastening of the axial housing on the motor housing when sliding on the connection housing can be effected such that both individual housings are fixedly connected to the motor housing after fastening the radial housing on this motor housing.

The radial housing which preferably receives the power electronics of the electronic speed controller, advantageously comprises a metallic base body which is provided with cooling ribs and on which a circuit board having power electronics is arranged, of which power components are connected to the base body in a heat-conducting manner, wherein the power components are arranged on the base of the base body in the regions which are lateral with respect to the longitudinal axis of the motor. The heat of the power electronics can be reliably dissipated via this base body provided with cooling means.

With regard to the cooling effect, it is particularly advantageous if the cooling ribs of the radial housing are directed towards the motor housing and preferably transversely to the motor axis. In particular, with the use of highly effective permanent magnet motors, as are preferably applied for the present invention, the waste heat produced by the electric motor is typically less than that produced by the power electronics of the speed controller. For this reason, it makes sense to transversely rib the radial housing, preferably in a manner such that the cooling ribs on the motor housing are continued, so that an intensive convection flow results when the motor is arranged in a lying manner and in particular when the radial housing is arranged on the upper side. Thereby, the cooling ribs of the radial housing advantageously extend in a free space formed between the base of the base body of the radial housing and the motor housing, thus utilise the free space formed between the essentially cylindrical motor housing and the base body, in order to achieve a particularly intensive convection cooling there.

Since permanent magnet motors are designed in a compact manner, depending on the power stage, it can be the case that a convection cooling by way of cooling ribs on the lower side of the base body of the radial housing which are arranged preferably transversely to the motor axis, are not sufficient in order to cool the power electronics of the speed controller, and then, according to an advantageous further development of the invention, the radial housing can be extended in the axial direction of the motor beyond the base body and be designed as a cooling body in the extended region. With this arrangement too, a free space which is present in any case may be utilized in order to provide the necessary cooling surfaces for convection cooling on the radial housing.

Advantageously, not only the base body of the radial housing, but also the motor housing carrying this can be designed in a metallic manner, wherein the motor housing is also provided with cooling ribs which are arranged radially and transversely to the motor axis and which are preferably arranged flush with the cooling ribs of the radial housing.

Usefully, a circuit board which carries the electric components e.g. of the speed controller, is arranged within the radial housing, and this circuit board extends through the radial housing in a surfaced manner, and specifically advantageously to into the part of the radial housing which projects beyond the axial housing or, if the axial housing connects to the radial housing in a plane transverse to the motor housing, to into the axial housing. In this manner, despite the arrangement of two individual housings, one can use a common, large circuit board which would not thus be able to be accommodated in one of the individual housings, at least when equipped.

Thus according to a further development of the invention, one envisages the circuit board in the region of the axial housing being provided with one or more electronic components which on the one hand have a construction size which could not be accommodated in the radial housing or only with difficulty, and on the other hand in the most favourable case are accommodated in a cooler housing part. This component can thus have a constructional height perpendicular to the circuit board, which is greater that the height of the space formed between the circuit board and the base or circuit board and cover of the radial housing, in which space this component or these components project through the flush recesses in the walls which are adjacent one another, into the other housing. Thus, thermal, as well as spatial, advantages are achieved by way of this.

If the radial housing, at least the base body consists of a metallic material, then a metallic wall which extends from the base of the base body to the circuit board and thus forms a part of an electromagnetic shielding can be formed in this radial housing or base body. A metallic shielding results for the components on the circuit board which are enclosed by this wall, due to the fact that this wall is advantageously designed as one piece with the base body. It is thus not necessary to envisage a separate shielding component here.

The electric motor according to the invention is basically available as a dry-runner for a multitude of applications, but is particularly advantageously applied as a wet-running motor for the drive of a centrifugal pump, thus forms part of a centrifugal pump assembly.

The invention is hereinafter explained in more detail by way of embodiment examples represented in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
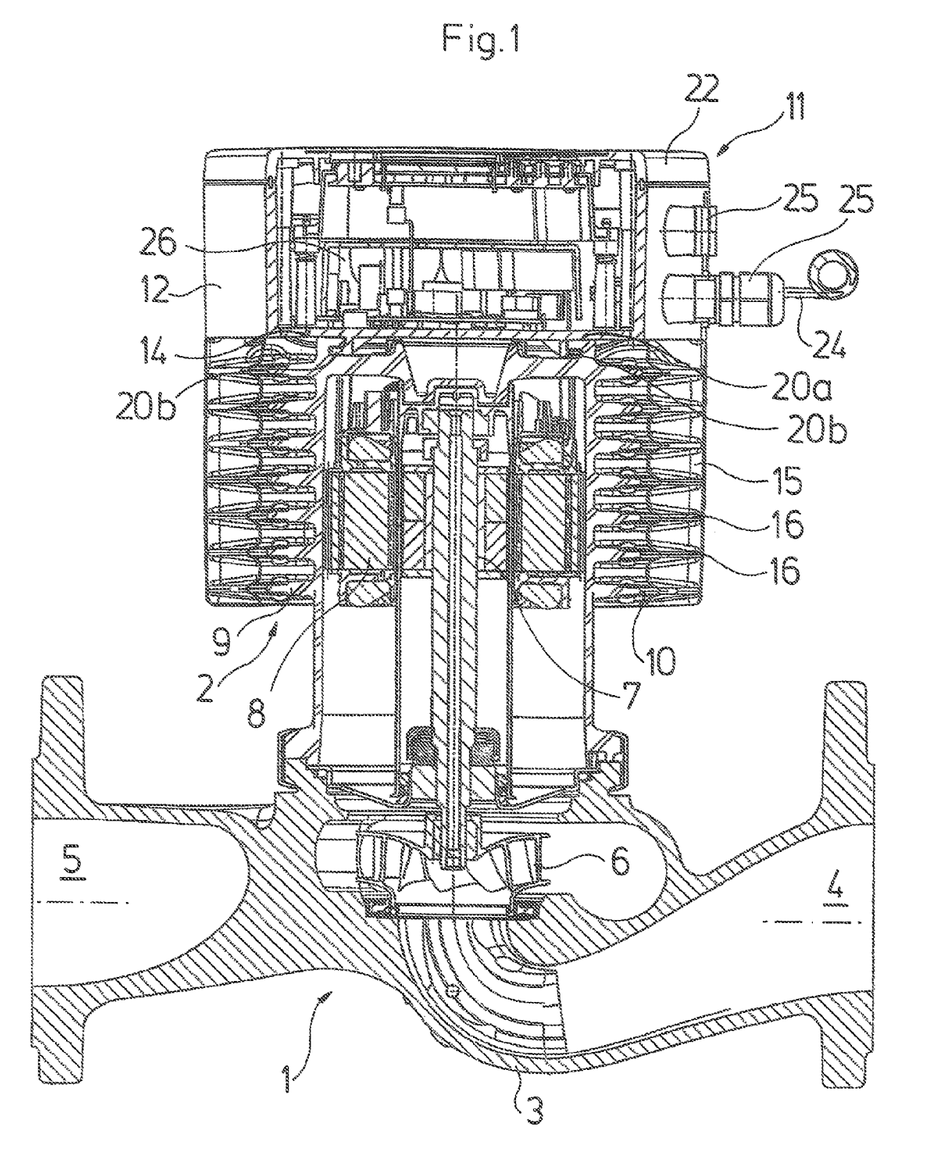
FIG. 1 is a partly sectioned representation, in a simplified perspective, of a pump assembly.

Referring to the drawings in particular, the pump assembly which is represented by way of FIG. 1 comprises a centrifugal pump 1 which is driven by an electric motor 2. The centrifugal pump 1 comprises a pump housing 3 with a suction union 4 and a pressure union 5. An impeller 6 is rotatably mounted within the pump housing 3 and is connected in a rotationally fixed manner to a rotor 7 of a permanent magnet motor 2 which connects to the impeller in the axis direction, and the stator 8 of this permanent magnet motor is surrounded by a motor housing 9. The rotor 7 is which is seated in a canned pot and runs in fluid, is rotatably arranged within the stator 8. The motor housing 9 is releasably connected to the pump housing 3 and has an essentially cylindrical shape. It is formed of metal as a die-cast component and comprises cooling rings 10 running radially at a distance to one another and surrounding the motor housing 9 by somewhat more than 180° of the periphery.

A connection housing 11 which consists of two individual housing parts, specifically of an axial housing 12 and a radial housing 13, is attached on the motor housing 9. The axial housing 12 seen in the direction of the rotation axis of the motor connects axially onto the motor housing 9, thus onto the free end-side 14 of the motor housing 9 which lies opposite and away from the pump housing. The radial housing 13 extends essentially in the radial direction to the motor axis, thus connects radially onto the motor housing 9, and specifically in the region in which the motor housing 9 is not ribbed.

Figure 2:
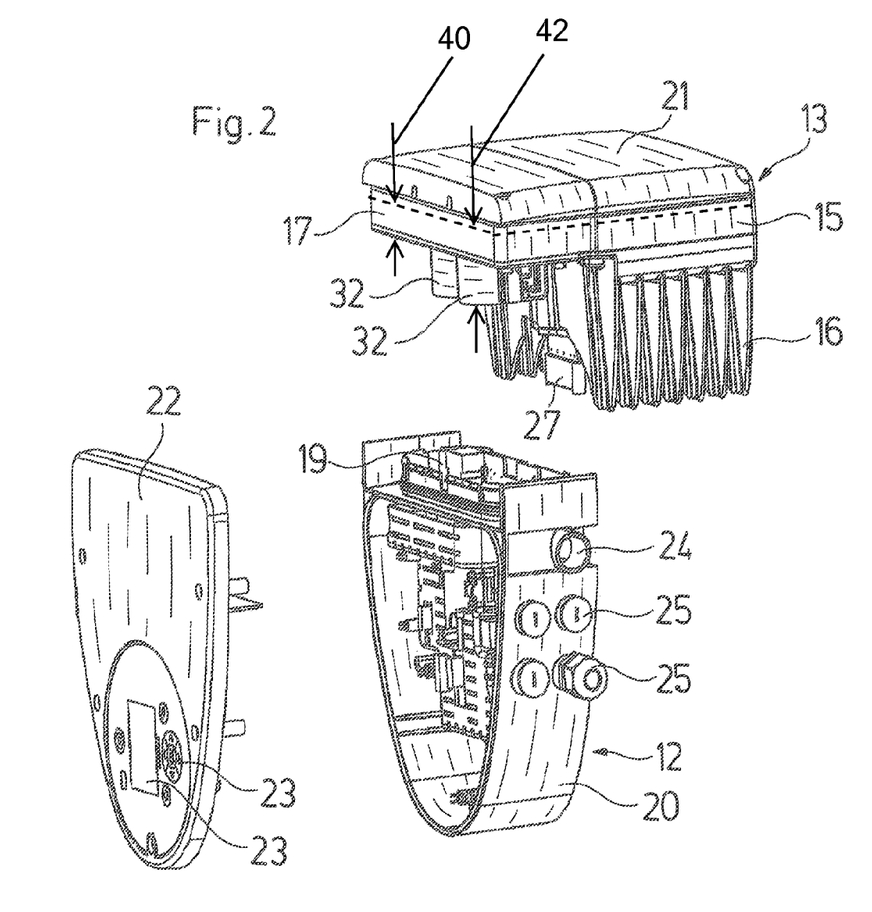
FIG. 2 is an exploded representation of the connection housing of the electric motor of the pump assembly according to FIG. 1.
Figure 3:
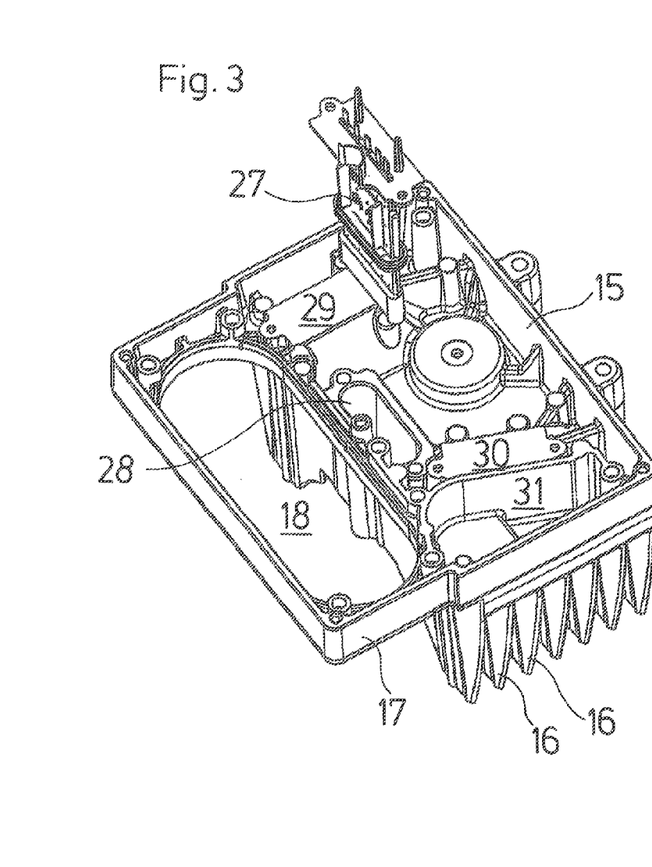
FIG. 3 is a perspective representation of the base housing of the radial housing.
Figure 4:
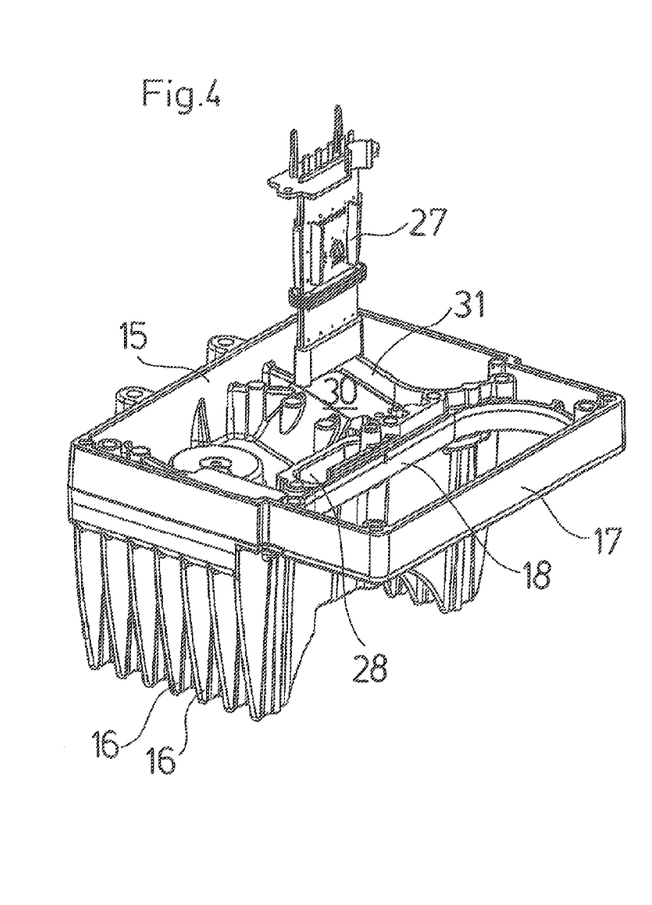
FIG. 4 is a representation from a different perspective from that according to FIG. 3.
Figure 5:
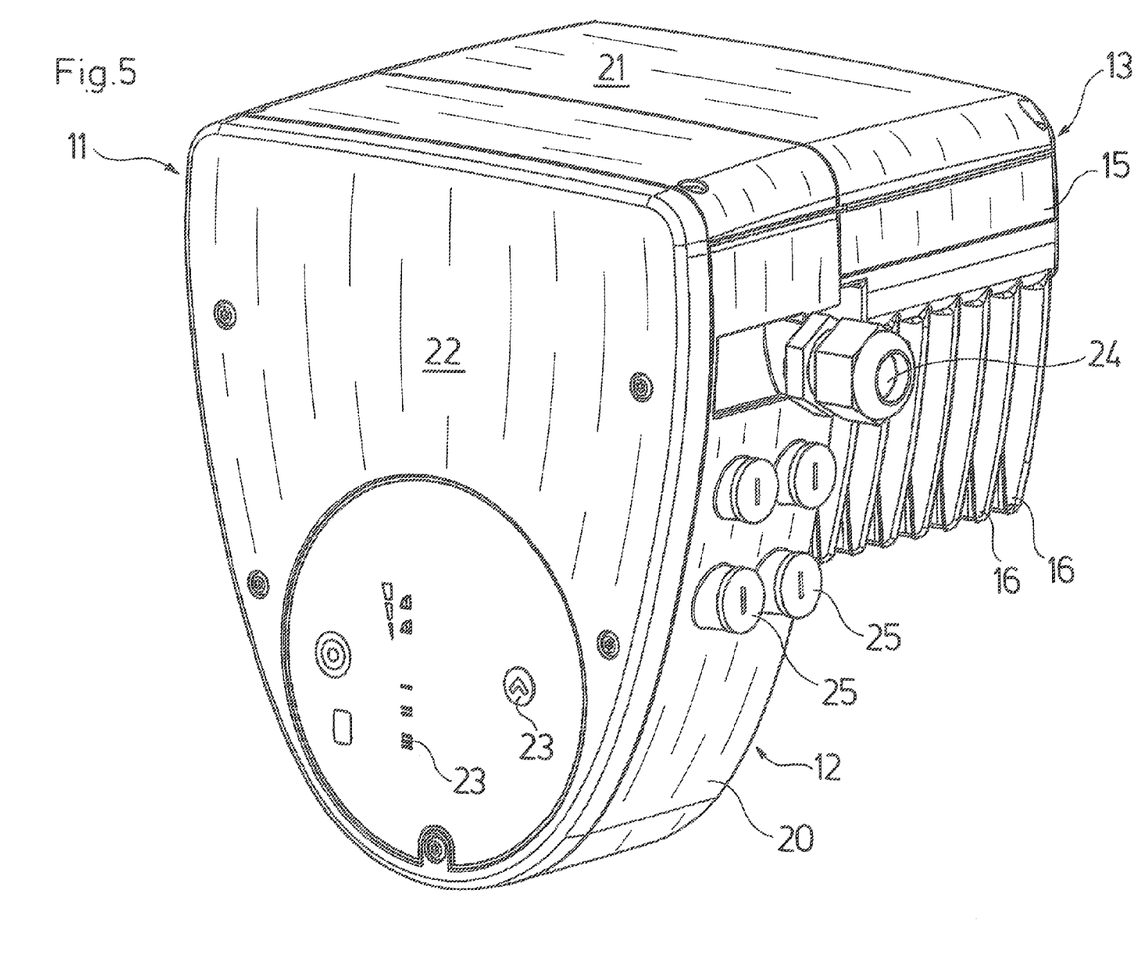
FIG. 5 is a perspective representation showing the connection housing according to FIG. 2, in the assembled condition.

Each of the individual housings 12 and 13 consists of a base body and a cover. The base body 15 of the radial housing 13 consist of a light metal alloy and is designed as a die cast component. The base body 15 is designed in a trough-like manner and with its base is screw-fastened on the motor housing 9. The base body 15 is designed in a ribbed manner towards the motor housing 9, wherein the cooling ribs 16 are likewise arranged transversely to the rotation axis of the motor, distanced to one another, in a manner such that they continue the cooling ribs 10 of the motor housing 9 in a flush manner. A larger distance between the base body 15 and the motor housing 9 and which is filled by the cooling ribs 16 which have a significantly greater height in this region, results in the side regions, since the base body 15 is only partly adapted to the rounding of the motor housing 9. The base body 15 has a projection 17, with which this extends beyond the axial end of the motor housing 9 into the region of the axial housing 12. The base body 15 in this region projecting beyond the axial housing 12, comprises a elongate-hole-like recess 18 in the base, said recess extending almost over the whole projecting region and being arranged flush to a recess 19 in a side wall of a base body 20 of the axial housing 12 connecting onto the motor housing 9 at the end-side which is opposite and away from the pump housing 3. This axial housing 12 continues the outer contour of the motor housing and radial housing 13 in the region of the motor in the axial direction and is closed off at one side by the projection 17 of the radial housing 13.

The base body 15 of the radial housing 13 is closed off by a cover 21 which is designed as a plastic injection molded part and closes off the trough-like base body 15 including the projection 17, to the outside in a sealed manner. The cover 21 comprises an integrally formed seal and is releasably fastened on the base body 15 by way of screws.

The base body 20 of the axial housing 12 also comprise a cover 22 which is screw-fastened in a releasable manner on the base body 20 likewise formed in an essentially trough-like manner and closes this base body in a sealed manner via an integrally formed seal.

The cover 22 and also the base body 20 are designed as plastic injection molded parts. The cover 22 contains all display and operating elements 23 of the complete assembly.

The axial housing 12 contains the motor control as well as all lead feed-throughs into the connection housing 11. In the represented embodiment example, a central lead feed-through 24 for a mains supply lead is provided, as well as four lead feed-throughs 25 which can be used only when required for control leads, sensor leads or likewise, but are otherwise closed in a sealed manner by a plug. The lead leading to the supply mains is connected within the axial housing 12.

The axial housing 12 and radial housing 13 are connected to one another with a positive fit via their base bodies 20 and 15, and specifically in the region of the recesses 17 and 18. The axial housing 12 in the region of its recess 19 comprises spring-elastic tongues which are led through the recess 18 in the base of the radial housing 13 and spring back behind the recess 18 in the manner of a barb, by which means these housings are connected to one another with a positive fit by way of simply putting them together. An integrally formed seal in this region ensures a hermetic closure to the outside.

The base bodies 15 and 20 thus after being equipped are connected to one another by way of simply sticking or putting together, whereupon the connection housing joined together in such a manner is placed radially onto the motor housing 9 and fastened on this. Guides 20b which fix the axial housing with a positive fit when placing onto the motor housing 9 and which engage behind, between the end-side 14 of the motor housing 9 and the base of the base body 20a connecting thereof, are provided in order to also fix the axial housing 12 on the motor housing 9 with a positive fit. These positive-fit means have the effect that with a force action on the axial housing 12, the positive-fit connection with the base body 20 and the recess 18 remain practically unloaded, but the external forces acting on the axial housing 12 are accommodated directly by the motor housing 9.

The base body 15 of the radial housing 13 on account of its material consisting of a light metal alloy has a thermal conductivity which is greater than that of the remaining housing parts of the connection housing 11 by more than a power of ten. The power components of the speed controller are therefore built in the base body 15. A circuit board is arranged within the radial housing 13 and extends almost over the entire length and width of the housing and the projection 17.

A central plug 27 engages into this circuit board 26 and is led in a sealing manner through a central recess 28 in the base of the base body 15 and contacts the windings of the motor via a recess which is provided flush to this in the motor housing 9.

Connection surfaces 29 and 30 are formed in the lateral regions of the radial housing 13, thus where the cooling rids 16 have their furthest extension, and these connection surfaces are connected in a thermally conductive manner to the power components arranged on the circuit board.

Moreover, a perpendicular wall 31 is formed within the base body 15 and in the installed position reaches to the circuit board 26 and together with the base and a side wall of the base body 15 forms an enclosure for electronic components which by way of this enclosure are encapsulated in a manner protected from spurious radiation.

Whilst the heat-producing power components of the rotational speed controller are arranged in the region of the trough-like base body 15, the components which due to their constructional size, in particular height 42 in the installed condition, would not fit in the free space 40 formed between the circuit board 26 and the base body 15, are led through the recess 18 so that these project into the axial housing 12. Hereby, it is also the case of components which are to be advantageously arranged in a cooler environment than that of the power electronics. Two capacitors 32 which are arranged in the region of the projection 17 on the circuit board 26, pass through the recesses 18 and 19 and project to into the axial housing 12, are clearly visible in FIG. 2. The inside of the axial housing 12 although being connected via the recesses 18, 19 to the housing inside of the radial housing 13, however has a significantly lower temperature level in operation. The electric connections between the individual housings 12 and 13 are also led through these recesses 18, 19.

Figure 6:
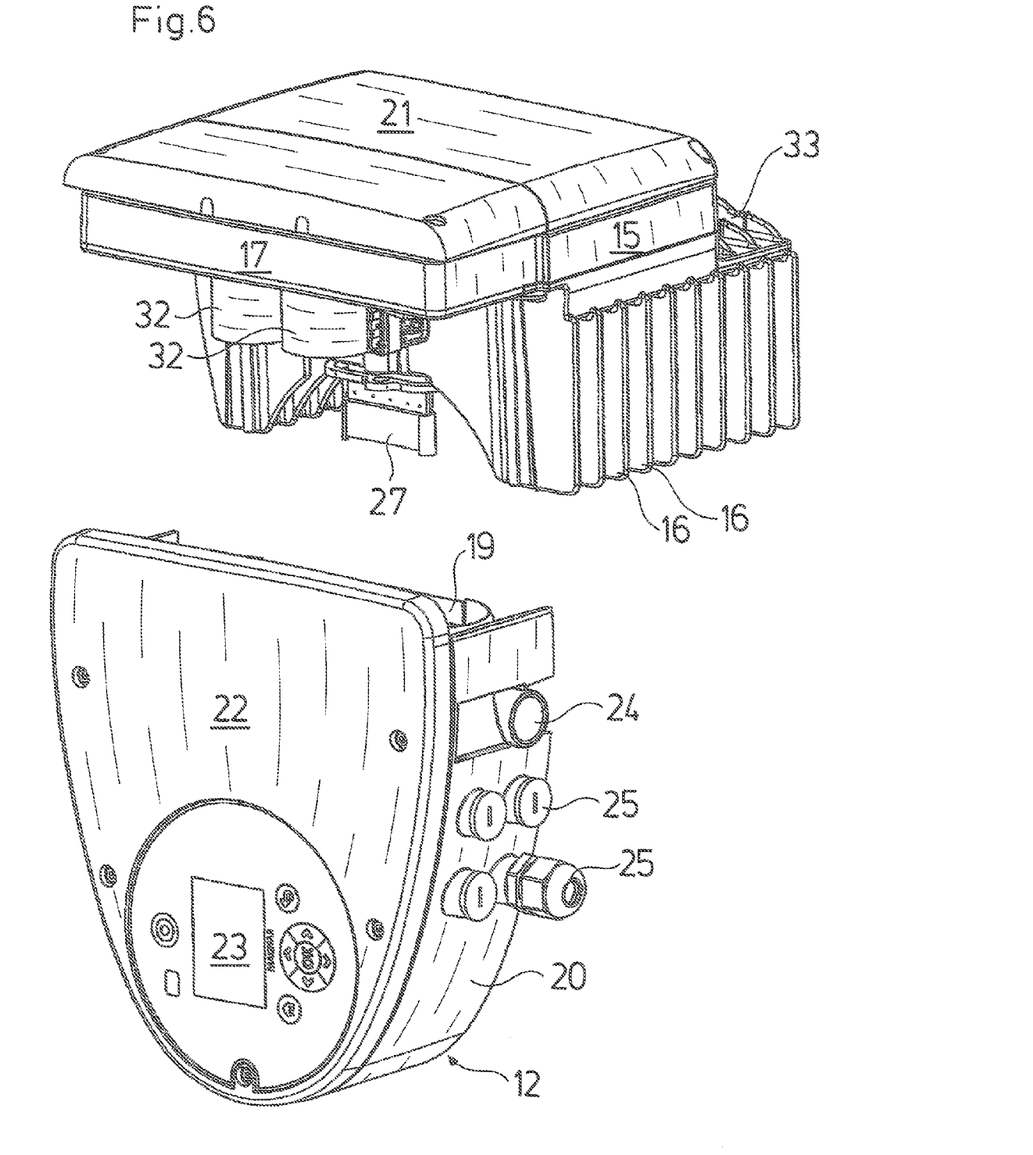
FIG. 6 is an exploded representation of another embodiment of the connection housing.

With the embodiment represented by way of FIG. 6 and which differs from the previously described embodiment only with regard to the base body 15, the base body 15 is designed in a manner extended by a cooling body 33, at its side which is opposite and away from the axial housing 12, thus directed towards the pump housing 3. With otherwise the same housing components, this connection housing can be applied for an electric motor of a greater nominal power by way of the integrally formed cooling body 33, since the speed controller which is then likewise dimensioned accordingly larger and is to be accommodated in the connection housing, can be accordingly cooled in a more intensive manner.

Figure 7:
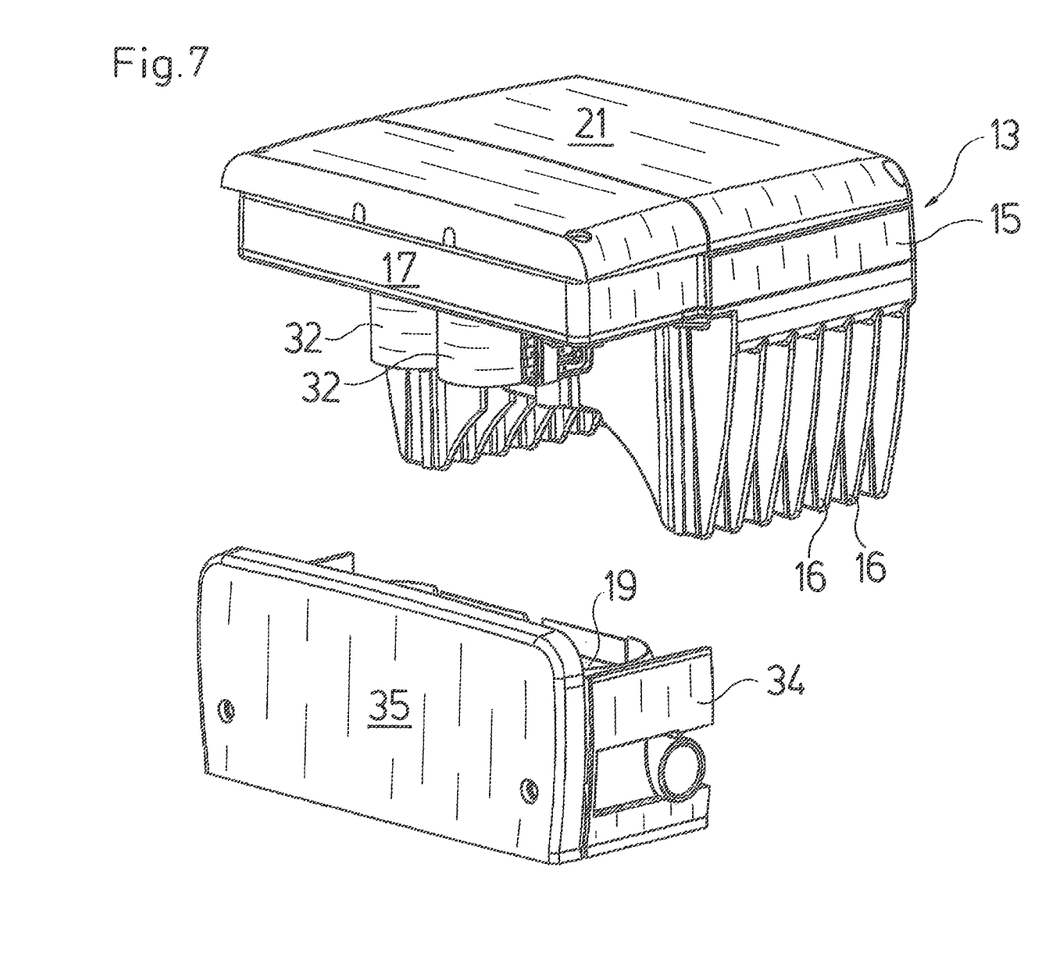
FIG. 7 is an exploded representation of a further embodiment of a connection housing.
Figure 8:
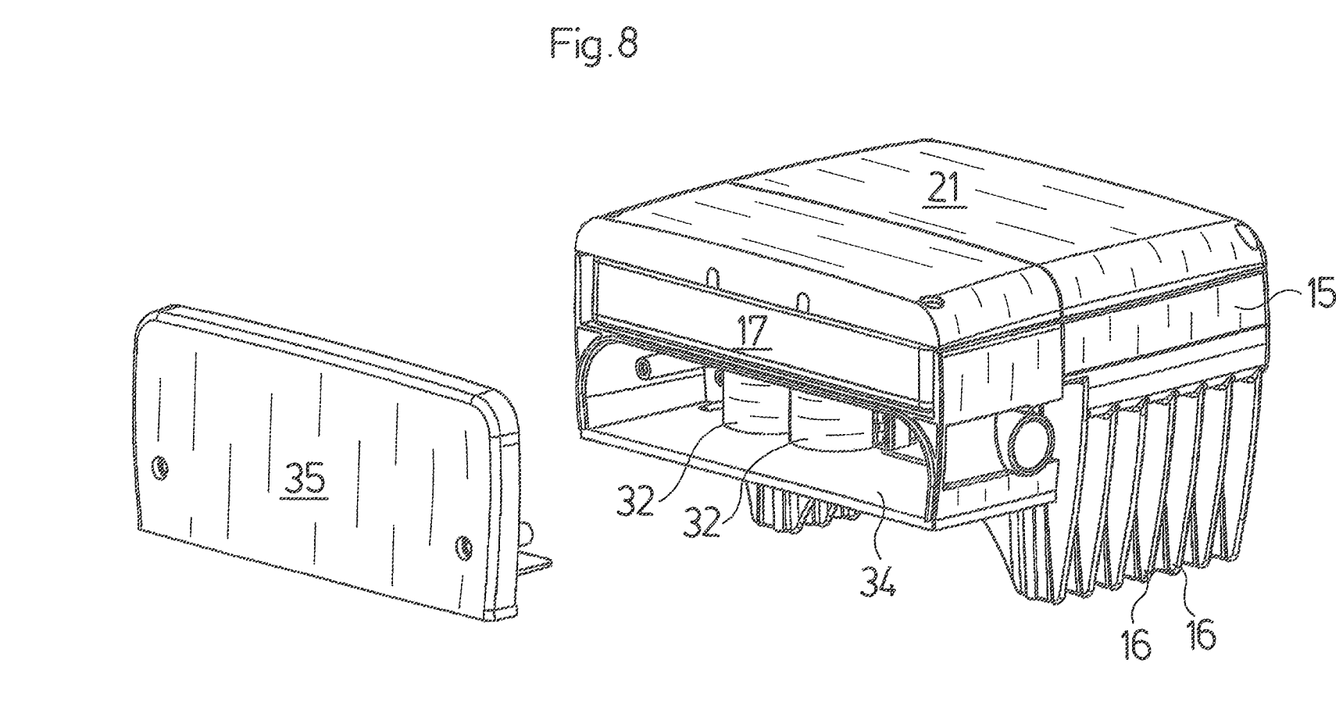
FIG. 8 is a an exploded representation of the connection housing according to FIG. 7, with a removed cover of the axial housing.

With the embodiment represented by way of FIGS. 7 and 8, the radial housing 13 is identical to that represented by way of FIGS. 1 to 5, but the axial housing is designed in a significantly shorter manner. This axial housing consists of a base body 34 and a cover 35. The base body 34 is co-fastened on the projection 17 of the radial housing 13 in the same manner as that described previously, but here axial housing extends practically only axially flush with the radial housing 13, so that the axial end-side of the motor housing 9 remains almost completely free. This embodiment variant can be provided if an external motor control or a simplified motor control is applied, with which for example one makes do without display and operating elements 23. Here, as the case may be, a wireless transmission to a display and operating unit which is not mechanically connected to the connection housing can be provided.

While specific embodiments of the invention have been shown and described in detail to illustrate the application of the principles of the invention, it will be understood that the invention may be embodied otherwise without departing from such principles.

The invention claimed is:

1. An electric motor comprising:
    a motor housing comprising a motor housing longitudinal axis, a motor housing axial end and a motor housing interior space, said motor housing interior space receiving at least a portion of a shaft for driving an impeller;
    a connection housing which is arranged outside on the motor housing, the connection housing receives electrical connections as well as electronic components and, with respect to said motor housing longitudinal axis, extends peripherally and axially of the motor housing, wherein the connection housing comprises two individual housings which are connected to one another, said two individual housing comprising an axial housing and a radial housing, said axial housing comprising an axial housing interior, said radial housing comprising a radial housing interior, said radial housing interior being connected to said axial housing interior, said axial housing connecting to said motor housing in an axial direction with respect to said motor housing longitudinal axis, said radial housing connecting to said motor housing in a radial direction with respect to said motor housing longitudinal axis, said radial housing comprising a radial housing base body, said radial housing base body comprising a radial housing base body projection, said radial housing base body projection extending beyond said motor housing axial end, wherein said radial housing base body projection is located at an axially spaced location from the impeller and said motor housing axial end with respect to said motor housing longitudinal axis;
    a circuit board arranged in said radial housing interior; and
    a plurality of capacitors in contact with said circuit board, one portion of each of said capacitors being arranged in said radial housing interior and another portion of each of said capacitors being arranged in said axial housing interior, wherein the individual housings are connected to one another with a positive fit, said positive fit comprising one or more click connections and/or lock connections, said radial housing body projection comprising a radial housing body projection recess, said axial housing comprising an axial housing recess, wherein yet another portion of each of said capacitors is arranged in said radial housing body projection recess and said axial housing recess.

2. An electric motor according to claim 1, wherein said axial housing is connected to said motor housing in a first area of said motor housing, said radial housing being connected to said motor housing in a second area of said motor housing, said first area being located at a spaced location from said second area, said axial housing comprising an opening, said opening being located on one side of said axial housing, wherein said radial housing base body projection closes said opening, said axial housing engaging said radial housing base body projection.

3. An electric motor according to claim 2, wherein the radial housing extends over the axial housing, and the radial housing and the axial housing are connected to one another in this region, said radial housing engaging a surface of said motor housing, at least a portion of said radial housing extending about a periphery of said motor housing, said surface extending parallel to said motor housing longitudinal axis, said axial housing engaging one end portion of said motor housing.

4. An electric motor according to claim 2, further comprising guide means, wherein the radial housing is screw-fastened on the motor housing and guide means is provided between the motor housing and the axial housing and holds the axial housing on the motor housing with a positive fit, said radial housing being located radially opposite a circumferential surface of said motor housing with respect to said motor axis, said motor axis being a longitudinal axis of said motor housing.

5. An electric motor according to claim 2, further comprising a circuit board, wherein:
    the radial housing comprises a metallic base body which is provided with cooling ribs and in which the circuit board, comprising power electronics, is arranged, whose power components are connected to the base body in a heat-conducting manner;
    the power components are arranged in regions on the base of the base body which are lateral with respect to the longitudinal axis of the motor;
    capacitors extend from a position in said radial housing interior to a position in said axial housing interior.

6. An electric motor according to claim 5, wherein the circuit board in the region of the axial housing comprises at least one electronic component, whose construction height perpendicularly to the circuit board is larger than the height of the space formed between the circuit board and the base of the radial housing.

7. An electric motor according to claim 2, wherein cooling ribs of the radial housing are directed towards the motor housing and are arranged transversely to the motor housing longitudinal axis, said cooling ribs extending in a radial direction with respect to said motor housing longitudinal axis, said radial housing body projection extending beyond an axial end of said cooling ribs.

8. An electric motor according to claim 2, wherein cooling ribs of the radial housing extend in a free space formed between the radial housing base body, and the motor housing.

9. An electric motor according to claim 2, wherein the motor housing is designed in a metallic manner and comprises cooling ribs which are arranged radially and transversely to the motor axis and which are arranged flush with the cooling ribs of the radial housing.

10. An electric motor according to claim 2, wherein a metallic wall is provided within the radial housing, said wall extending from the base of the base body to the circuit board and forming part of an electromagnetic shielding.

11. An electric motor according to claim 1, wherein only said axial housing comprises one or more lead feed-throughs into the outer surroundings, said radial housing base body projection extending parallel to said motor housing longitudinal axis.

12. An electric motor according to claim 11, wherein the one or more lead feed-throughs are arranged in a radial peripheral wall of the axial housing.

13. An electric motor according to claim 1, wherein the radial housing and the axial housing are constructed of several parts, wherein the materials of at least two components of the individual housings differ in thermal conductivity by at least a power of ten.

14. An electric motor according to claim 1, wherein the radial housing comprises a radial housing cover and said axial housing comprises an axial housing base body and an axial housing cover, said axial housing base body being in direct contact with said axial housing base cover, wherein the axial housing cover is arranged on the side of the axial housing base body which lies opposite and away from the motor housing, said axial housing base body and said axial housing cover defining at least a portion of said axial housing interior, said radial housing base body being in direct contact with said radial housing base cover, wherein the radial housing cover is arranged on the side of the radial housing base body which lies opposite and away from the motor housing, said radial housing base body and said radial housing cover defining at least a portion of said radial housing interior, said radial housing extending in the radial direction with respect to said motor housing longitudinal axis, said axial housing extending parallel to said motor housing longitudinal axis, said radial housing interior being located at a spaced location from said axial housing interior.

15. An electric motor according to claim 14, wherein a display and/or operating unit is provided, which is arranged in the axial housing cover.

16. An electric motor according to claim 1, wherein the connection housing receives an electronic speed controller for the motor, and the power part of the speed controller is arranged in the radial housing, and the motor control is arranged in the axial housing.

17. An electric motor according to claim 1, wherein recesses which are flush with one another, sealing means surrounding these, as well as fastening means, are provided in the region, in which the axial housing and the radial housing connect on one another, in the walls of both housings.

18. An electric motor according to claim 1, wherein the radial housing is extended beyond the base body in the axial direction of the motor and is designed as a cooling body in the extended region, said motor housing comprising another axial end located opposite said one axial end, said one axial end defining one side of said motor housing, said another axial end defining another side of said motor housing, said one side being opposite said another side, said radial housing body projection projects beyond said one side of said motor housing, wherein the impeller is located on said another side of said motor housing.

19. An electric motor comprising:
a motor housing comprising a motor housing longitudinal axis, a motor housing axial end and a motor housing interior space, said motor housing interior space receiving at least a portion of a shaft for driving an impeller;
a connection housing which is arranged outside on the motor housing, the connection housing receives electrical connections as well as electronic components and, with respect to said motor housing longitudinal axis, extends peripherally and axially of the motor housing, wherein the connection housing comprises two individual housings which are connected to one another, said two individual housing comprising an axial housing and a radial housing, said axial housing comprising an axial housing interior, said radial housing comprising a radial housing interior, said radial housing interior being connected to said axial housing interior, said axial housing connecting to said motor housing in an axial direction with respect to said motor housing longitudinal axis, said radial housing connecting to said motor housing in a radial direction with respect to said motor housing longitudinal axis, said radial housing comprising a radial housing base body, said radial housing base body comprising a radial housing base body projection, said radial housing base body projection extending beyond said motor housing axial end, wherein said radial housing base body projection is located at an axially spaced location from the impeller and said motor housing axial end with respect to said motor housing longitudinal axis, said axial housing being connected to said motor housing in a first area of said motor housing, said radial housing being connected to said motor housing in a second area of said motor housing, said first area being located at a spaced location from said second area, said axial housing comprising an opening, said opening being located on one side of said axial housing, wherein said radial housing base body projection closes said opening, said axial housing engaging said radial housing base body projection; and
a circuit board, wherein the radial housing comprises a metallic base body which is provided with cooling ribs and in which the circuit board, comprising power electronics, is arranged, whose power components are connected to the base body in a heat-conducting manner, the power components being arranged in regions on the base of the base body which are lateral with respect to the longitudinal axis of the motor, wherein capacitors extend from a position in said radial housing interior to a position in said axial housing interior.

20. An electric motor comprising:
a motor housing comprising a motor housing longitudinal axis, a motor housing axial end and a motor housing interior space, said motor housing interior space receiving at least a portion of a shaft for driving an impeller;
a connection housing which is arranged outside on the motor housing, the connection housing receives electrical connections as well as electronic components and, with respect to said motor housing longitudinal axis, extends peripherally and axially of the motor housing, wherein the connection housing comprises two individual housings which are connected to one another, said two individual housing comprising an axial housing and a radial housing, said axial housing comprising an axial housing interior, said radial housing comprising a radial housing interior, said radial housing interior being connected to said axial housing interior, said axial housing connecting to said motor housing in an axial direction with respect to said motor housing longitudinal axis, said radial housing connecting to said motor housing in a radial direction with respect to said motor housing longitudinal axis, said radial housing comprising a radial housing base body, said radial housing base body comprising a radial housing base body projection, said radial housing base body projection extending beyond said motor housing axial end, wherein said radial housing base body projection is located at an axially spaced location from the impeller and said motor housing axial end with respect to said motor housing longitudinal axis, said axial housing being connected to said motor housing in a first area of said motor housing, said radial housing being connected to said motor housing in a second area of said motor housing, said first area being located at a spaced location from said second area, said axial housing comprising an opening, said opening being located on one side of said axial housing, wherein said radial housing base body projection closes said opening, said axial housing engaging said radial housing base body projection; and a circuit board, wherein the radial housing comprises a metallic base body which is provided with cooling ribs and in which the circuit board, comprising power electronics, is arranged, whose power components are connected to the base body in a heat-conducting manner, the power components being arranged in regions on the base of the base body which are lateral with respect to the longitudinal axis of the motor, wherein capacitors extend from a position in said radial housing interior to a position in said axial housing interior, wherein the circuit board in the region of the axial housing comprises at least one electronic component, whose construction height perpendicularly to the circuit board is larger than the height of the space formed between the circuit board and the base of the radial housing.

* * * * *